United States Patent
Takamori et al.

(10) Patent No.: US 11,670,164 B2
(45) Date of Patent: Jun. 6, 2023

(54) CROSSWIND EFFECT ESTIMATION DEVICE AND CONTROL DEVICE FOR VEHICLE

(71) Applicant: JTEKT CORPORATION, Kariya (JP)

(72) Inventors: Kyouhei Takamori, Takaoka (JP); Hiroto Takaue, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 127 days.

(21) Appl. No.: 16/895,625

(22) Filed: Jun. 8, 2020

(65) Prior Publication Data
US 2020/0394907 A1 Dec. 17, 2020

(30) Foreign Application Priority Data
Jun. 13, 2019 (JP) .............................. JP2019-110554

(51) Int. Cl.
*G08G 1/048* (2006.01)
*G08G 1/01* (2006.01)
*B60W 40/02* (2006.01)

(52) U.S. Cl.
CPC ............. *G08G 1/048* (2013.01); *B60W 40/02* (2013.01); *G08G 1/0116* (2013.01); *G08G 1/0141* (2013.01); *B60W 2520/14* (2013.01)

(58) Field of Classification Search
CPC ............... B60T 2201/14; B60T 8/1755; B60T 2201/083; B60T 2230/06; B60T 8/1708; B60T 8/17557; B60G 2400/841; B60G 17/0165; B60G 2400/0511; B60G 2400/0516; B60G 2400/05162; B60W 2520/10; B60W 2520/14; B60W 2555/20;
(Continued)

(56) References Cited

U.S. PATENT DOCUMENTS 5,315,868 A * 5/1994 Jacobi ...................... B62D 6/04
                                                    702/138
5,332,059 A * 7/1994 Shirakawa ............. B60K 23/04
                                                    180/197
(Continued)

FOREIGN PATENT DOCUMENTS

JP      63-207732 A     8/1988
JP      2002-211380 A   7/2002
(Continued)

OTHER PUBLICATIONS

Japanese Offce Action issued in Japanese Patent Application No. 2019-110554 dated Feb. 21, 2023, (w/ Partal Ergiish Translation).

*Primary Examiner* — Maceeh Anwari
*Assistant Examiner* — Aarron E Santos
(74) *Attorney, Agent, or Firm* — Oblon, McClelland, Maier & Neustadt, L.L.P.

(57) ABSTRACT

A crosswind effect estimation device is mounted in a vehicle and configured to estimate an effect on the vehicle due to a crosswind. The crosswind effect estimation device includes a processor configured to i) acquire information on the crosswind in a predetermined region forward of the vehicle in a traveling direction of the vehicle, ii) acquire information on a shielding object that is located on a windward side in a direction of the crosswind, and iii) estimate the effect on the vehicle due to the crosswind based on the acquired information on the crosswind and the acquired information on the shielding object.

7 Claims, 11 Drawing Sheets

(58) Field of Classification Search
CPC .. B60W 30/02; B60W 2540/18; B60W 10/18; B60W 10/184; B60W 2520/28; B60W 2720/14; B60W 2720/406; B60W 10/16; B60W 10/20; B60W 2556/50; B60W 2710/18; B60W 30/12; B60W 40/02; B60W 40/114; B60W 50/0097; B60W 10/026; B60W 10/119; B60W 10/188; B60W 10/22; B60W 2050/0013; B60W 2050/0031; B60W 2050/0094; B60W 2520/105; B60W 2520/125; B60W 2530/00; B60W 2530/10; B60W 2554/4023; B60W 2554/404; B60W 2554/80; B60W 2556/45; B60W 2710/027; B60W 2710/207; B60W 2710/223; B60W 30/10; B60W 30/182; G01P 5/14

See application file for complete search history.

(56) References Cited

U.S. PATENT DOCUMENTS

| 5,379,218 | A  | * | 1/1995 | Jacobi | B62D 6/04 |
| | | | | | 296/180.1 |
| 2015/0025745 | A1 | * | 1/2015 | Tamura | B62D 6/00 |
| | | | | | 701/41 |
| 2016/0039416 | A1 | * | 2/2016 | Shimokawa | B60W 30/02 |
| | | | | | 701/36 |
| 2017/0113546 | A1 | * | 4/2017 | Maeda | B60K 17/3515 |
| 2017/0334444 | A1 | * | 11/2017 | Hawes | B60W 10/20 |
| 2017/0361834 | A1 | * | 12/2017 | Paskus | B60T 8/1755 |
| 2018/0037259 | A1 | * | 2/2018 | Hawes | B62D 15/021 |
| 2018/0354527 | A1 | * | 12/2018 | Fukunaga | B60W 30/16 |
| 2019/0111931 | A1 | * | 4/2019 | Matsunaga | B60W 30/18154 |
| 2019/0152471 | A1 | * | 5/2019 | Mitsumoto | B60W 30/02 |

FOREIGN PATENT DOCUMENTS

| JP | 2009-257383 A | 11/2009 |
| JP | 2019-038394 A | 3/2019 |

* cited by examiner

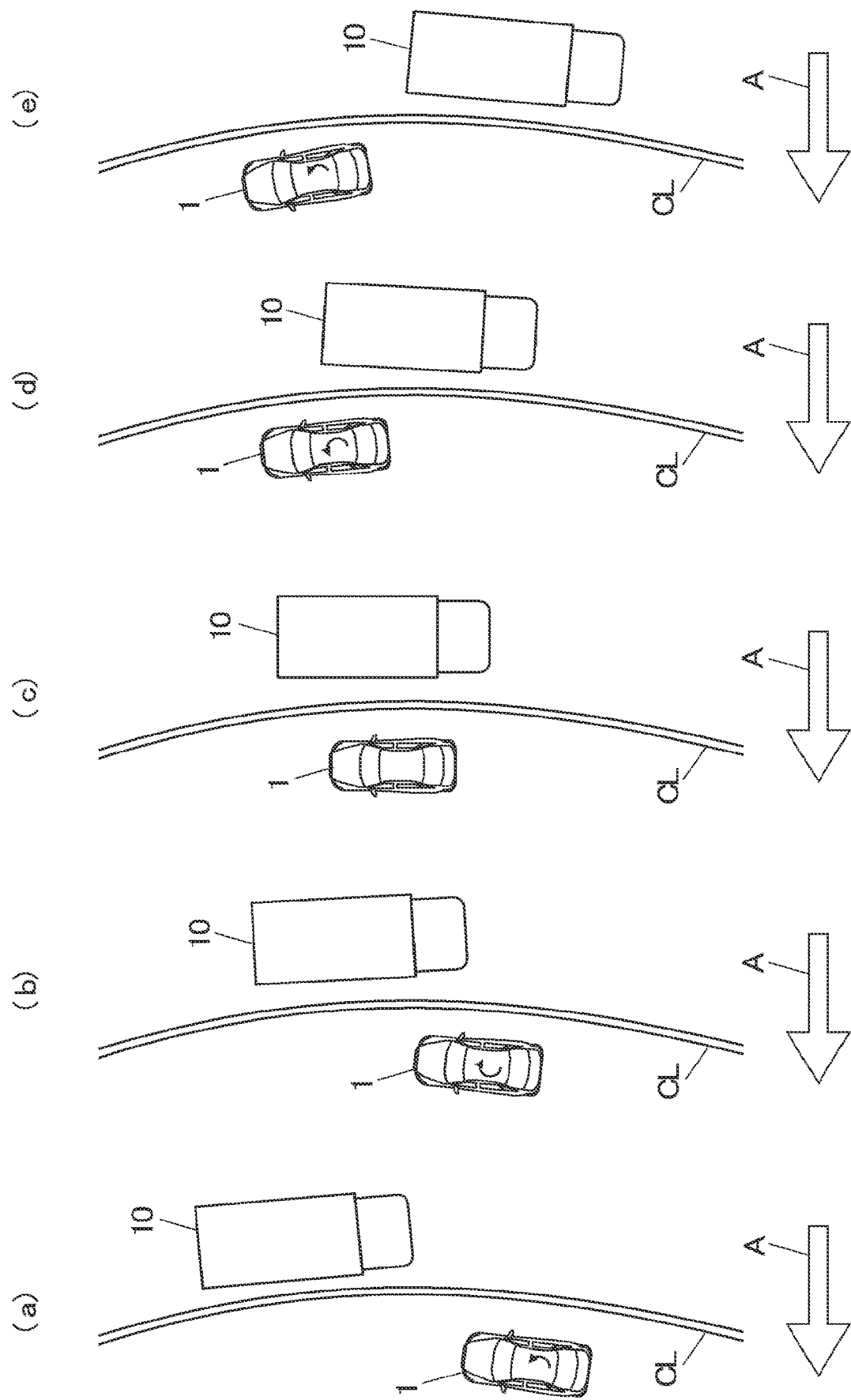

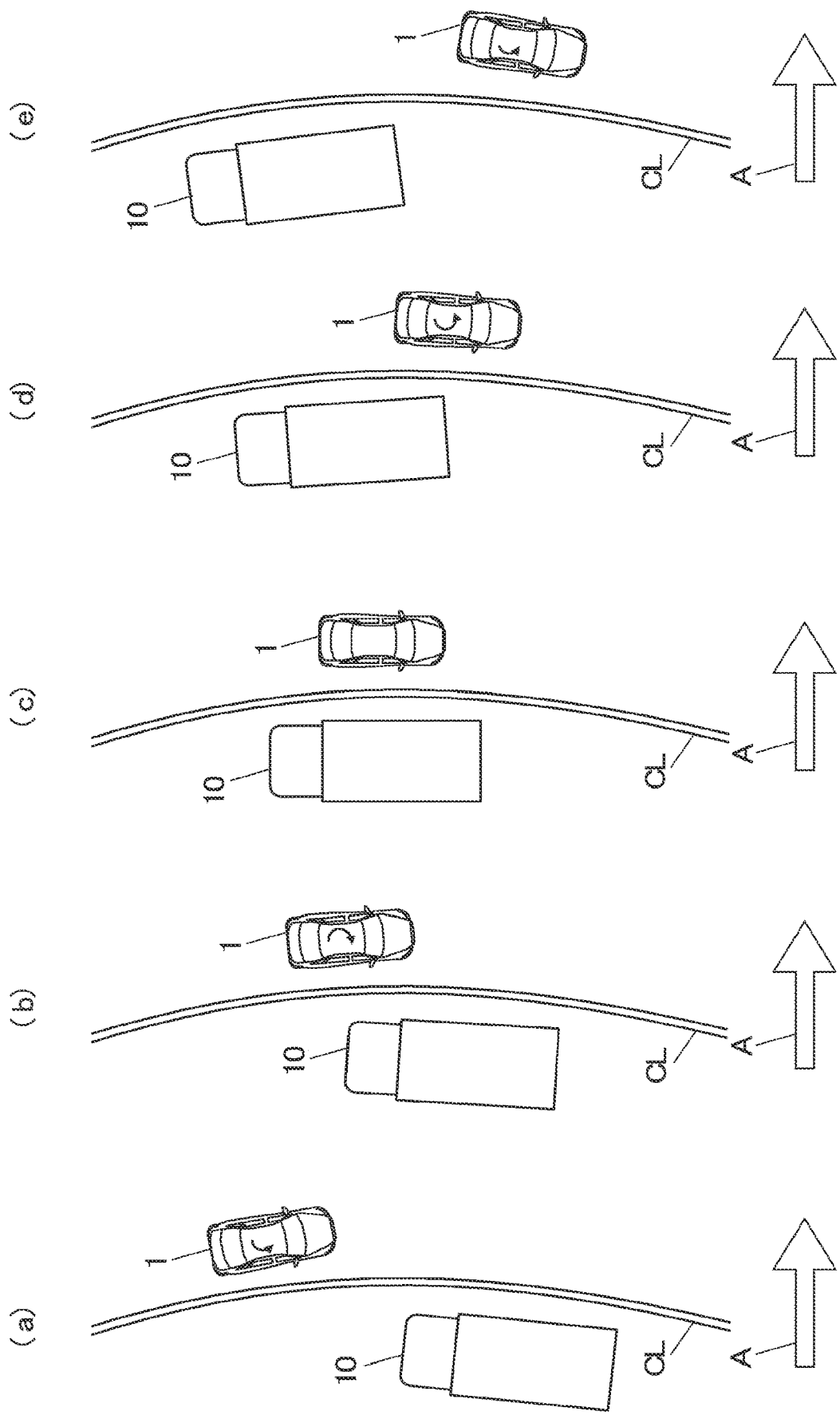

CROSSWIND EFFECT ESTIMATION DEVICE AND CONTROL DEVICE FOR VEHICLE

CROSS-REFERENCE TO RELATED APPLICATION

This application claims priority to Japanese Patent Application No. 2019-110554 filed on Jun. 13, 2019, incorporated here by reference in its entirety.

BACKGROUND

1. Technical Field

The disclosure relates to a crosswind effect estimation device configured to estimate an effect on a vehicle due to a crosswind, and a control device for a vehicle, which is configured to control a drive force distribution ratio for vehicle wheels.

2. Description of Related Art

There has been proposed a differential limiting force control device that restrains swaying of a vehicle from side to side due to an external disturbance such as a crosswind during traveling by limiting the differential motion between right and left wheels (for example, refer to Japanese Unexamined Patent Application Publication No. 2009-257383 (JP 2009-257383 A)).

The differential limiting force control device described in JP 2009-257383 A includes a wind force detection unit, a differential device, a differential limiting unit, and a differential limiting force control unit. The wind force detection unit detects a wind force that is received by a portion of a vehicle, the portion being located forward of the center of gravity of the vehicle. The differential device transmits a power generated by a power generation device to right and left drive wheels while allowing the differential motion between the right and left drive wheels. The differential limiting unit limits the differential motion allowed by the differential device by generating a differential counterforce that counters the differential motion between the right and left wheels. The differential limiting force control unit controls the differential control unit such that, when the wind force detection unit detects the wind force, the differential limiting unit generates the differential counterforce in accordance with the detected wind force.

SUMMARY

However, when the vehicle receives the crosswind while traveling, the differential limiting force control unit in related art controls the differential control unit only after the effect on the vehicle due to the crosswind, etc., is detected by a sensor and the like. Therefore, a vehicle behavior is temporarily disturbed, which may cause a driver to have a feeling of anxiety. If the condition of a wind forward of the vehicle in a traveling direction of the vehicle can be detected using the technology of road-to-vehicle communication that has been widely used, the effect on traveling of the vehicle due to the wind can be estimated to some extent. However, when an object that shields against the wind exists, the effect due to the wind may not be estimated accurately.

Therefore, the inventors have conceived an idea that, if it is possible to estimate in advance the effect on the vehicle due to the crosswind in consideration of presence of the shielding object, disturbance of the vehicle behavior can be restrained, and further, the driver can be restrained from having a feeling of anxiety. Thus, the inventors have made the disclosure based on this idea.

The disclosure provides a crosswind effect estimation device that can estimate in advance the effect on the vehicle due to the crosswind, and a control device for a vehicle that can restrain disturbance of the vehicle behavior based on the effect due to the crosswind, the effect being estimated in advance.

A first aspect of the disclosure relates to a crosswind effect estimation device that is mounted in a vehicle and configured to estimate an effect on the vehicle due to a crosswind. The crosswind effect estimation device includes a processor configured to i) acquire information on the crosswind in a predetermined region forward of the vehicle in a traveling direction of the vehicle, ii) acquire information on a shielding object that is located on a windward side in a direction of the crosswind, and iii) estimate the effect on the vehicle due to the crosswind based on the acquired information on the crosswind and the acquired information on the shielding object.

A second aspect of the disclosure relates to a control device for a vehicle including vehicle wheels including right and left front wheels and right and left rear wheels. The control device is configured to control a drive force distribution ratio for the vehicle wheels. The control device includes at least one processor configured to i) acquire information on a crosswind in a predetermined region forward of the vehicle in a traveling direction of the vehicle, ii) acquire information on a shielding object that is located on a windward side in a direction of the crosswind, iii) estimate an effect on the vehicle due to the crosswind to obtain an estimation result, based on the acquired information on the crosswind and the acquired information on the shielding object, and iv) control the drive force distribution ratio for the vehicle wheels, based on the obtained estimation result.

With the crosswind effect estimation device according to the above aspect of the disclosure, the effect on the vehicle due to the crosswind can be estimated in advance in consideration of the presence of the shielding object. With the control device for a vehicle according to the above aspect of the disclosure, disturbance of the vehicle behavior can be restrained based on the estimated effect due to the crosswind.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 5A:
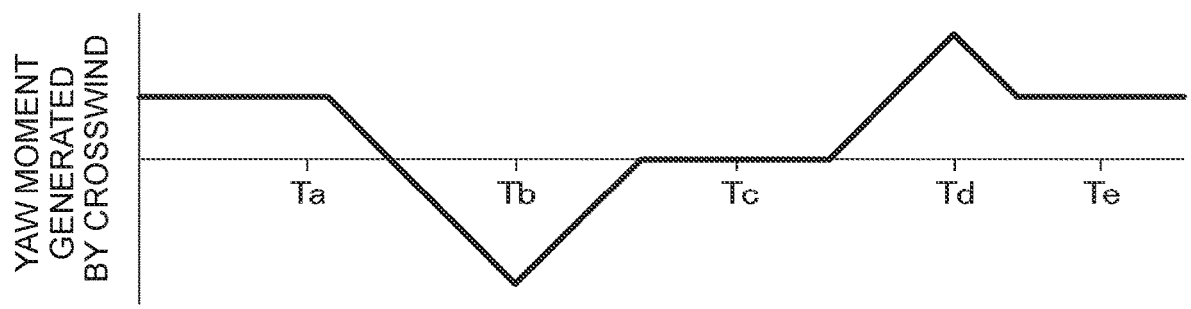
Figure 5B:
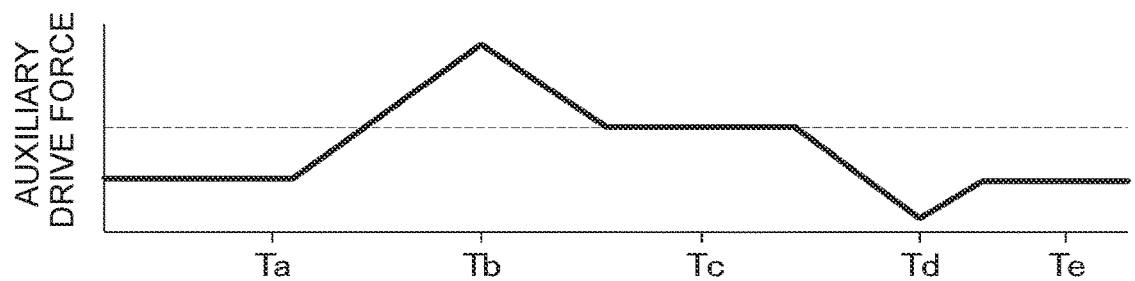
Figure 7A:
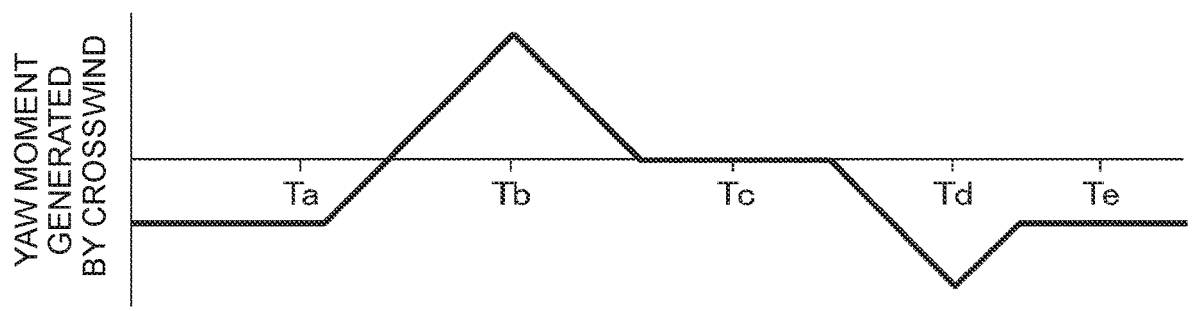
Figure 7B:
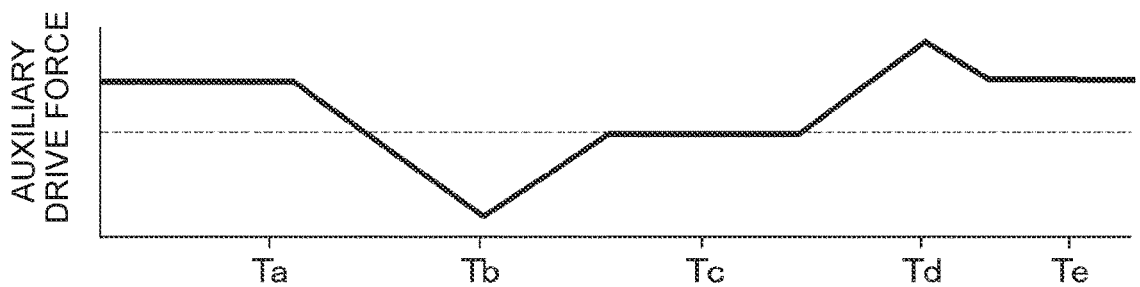
Figure 8:
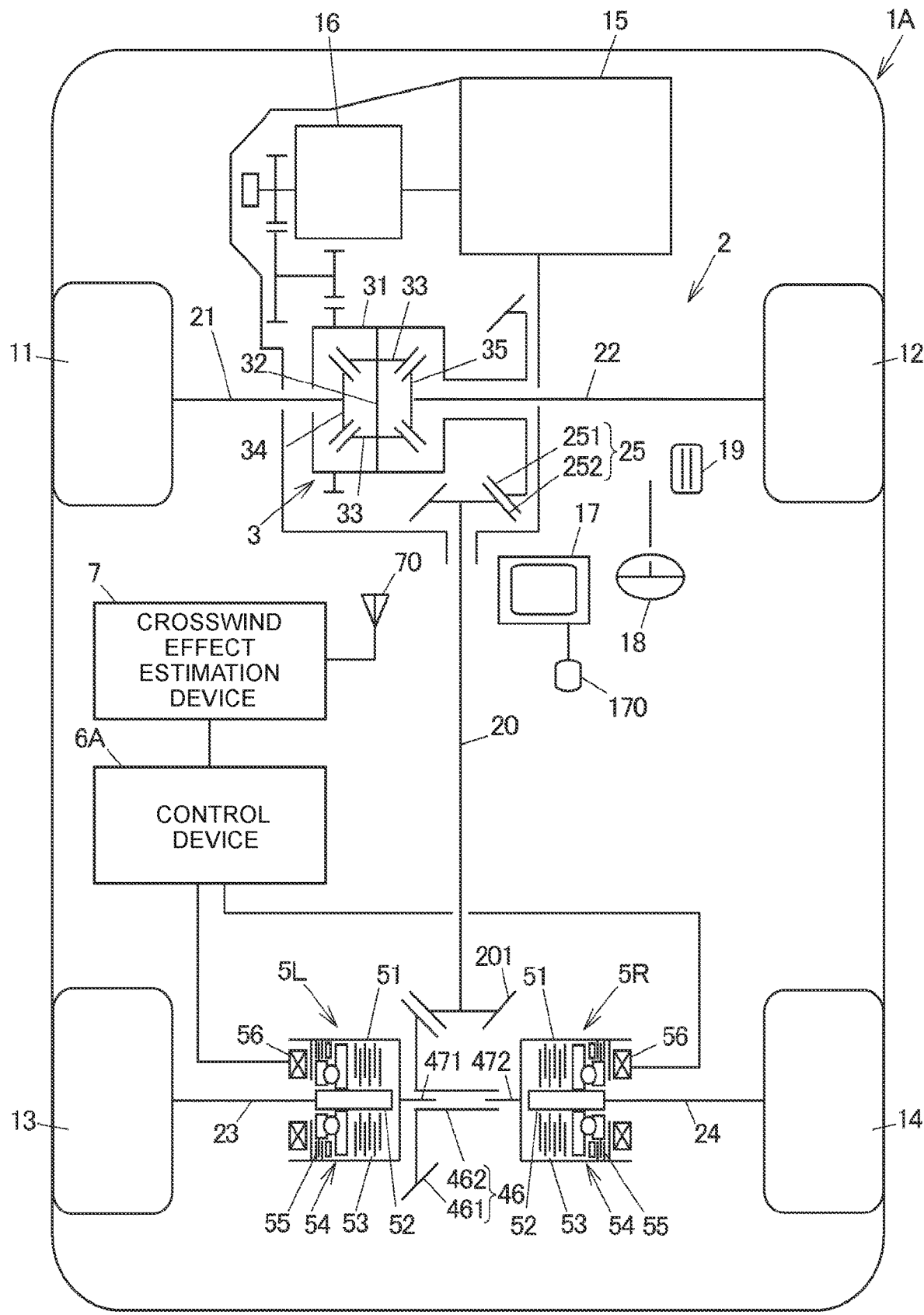
Figure 9:
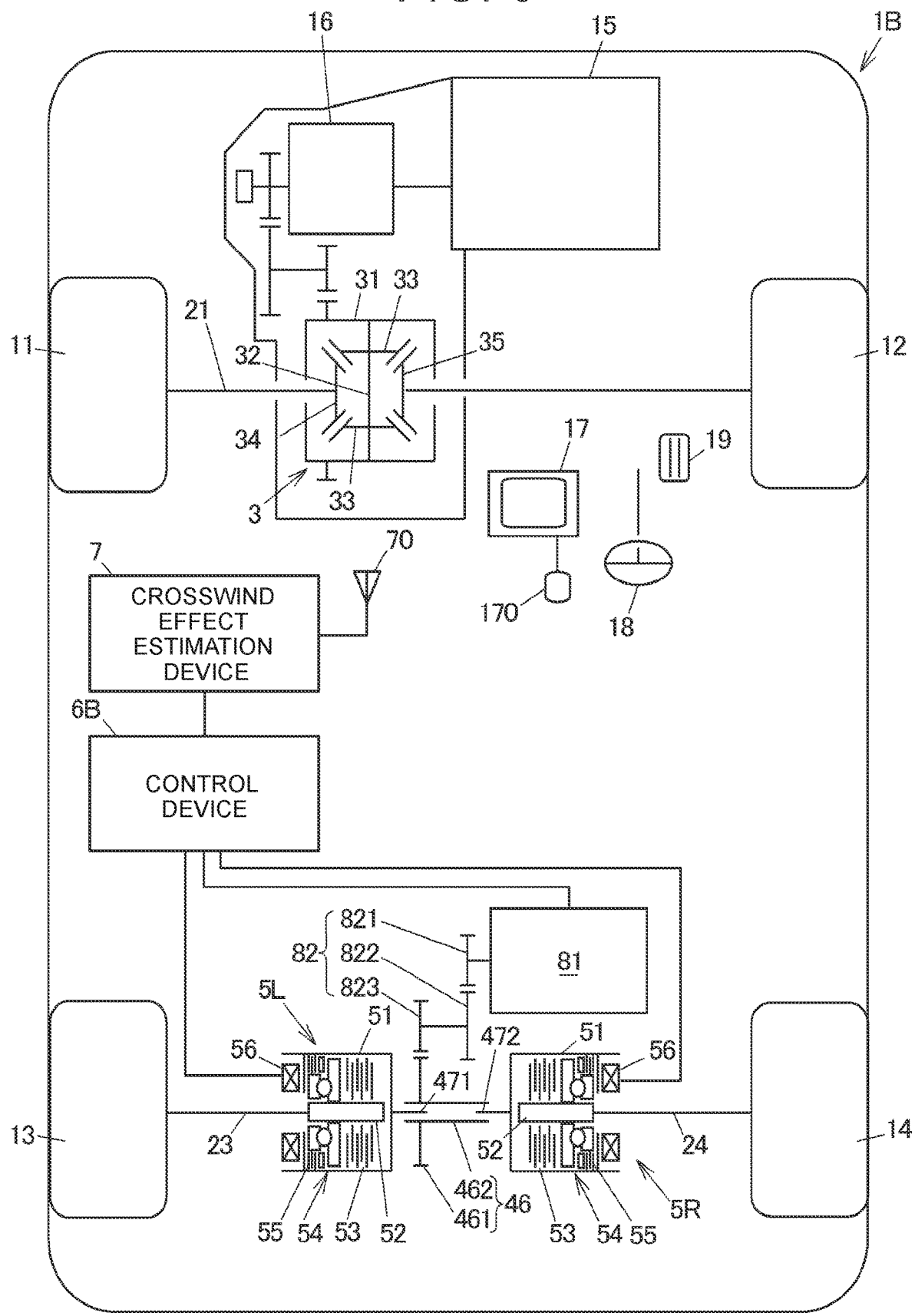
Figure 10:
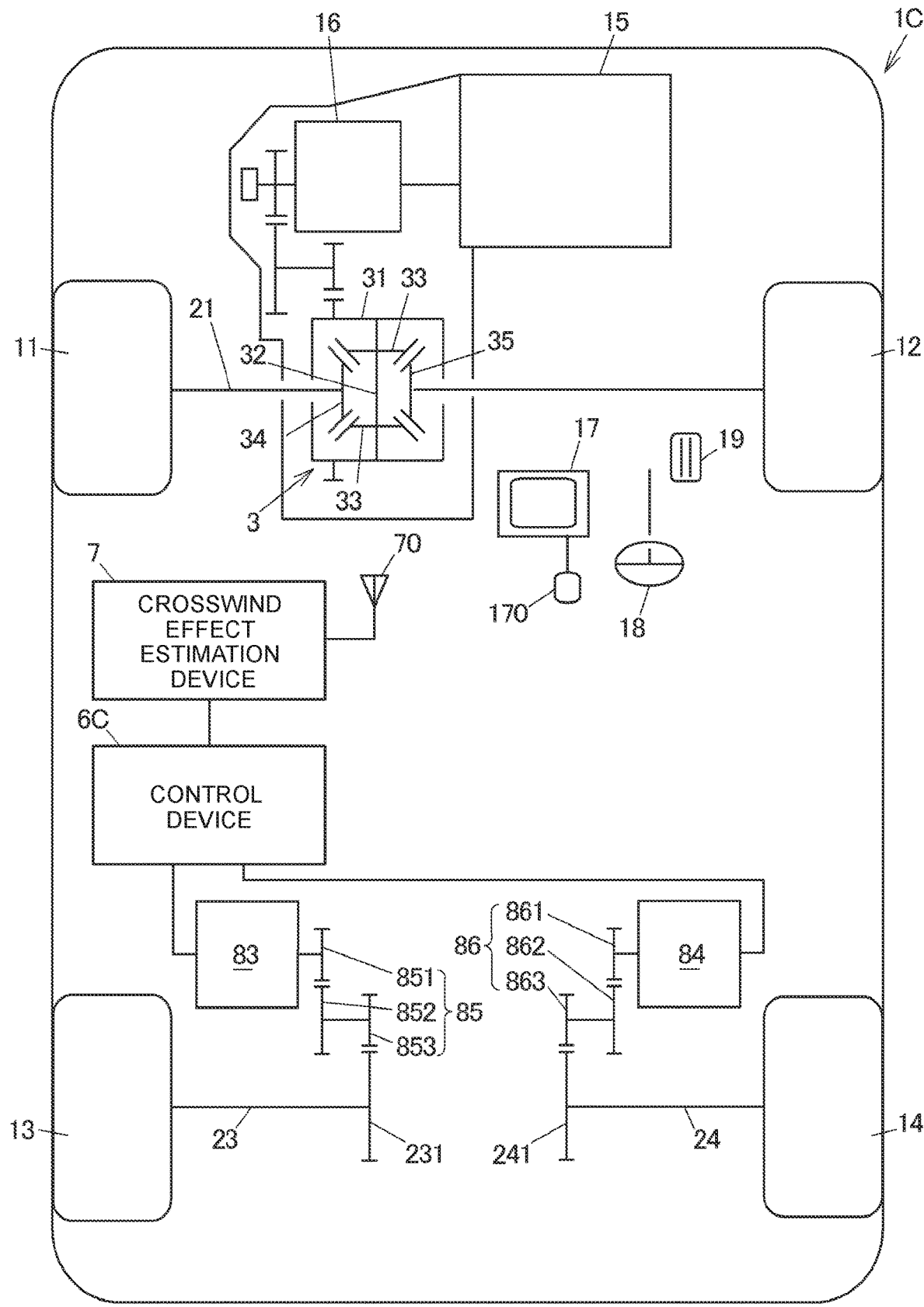
Figure 11:
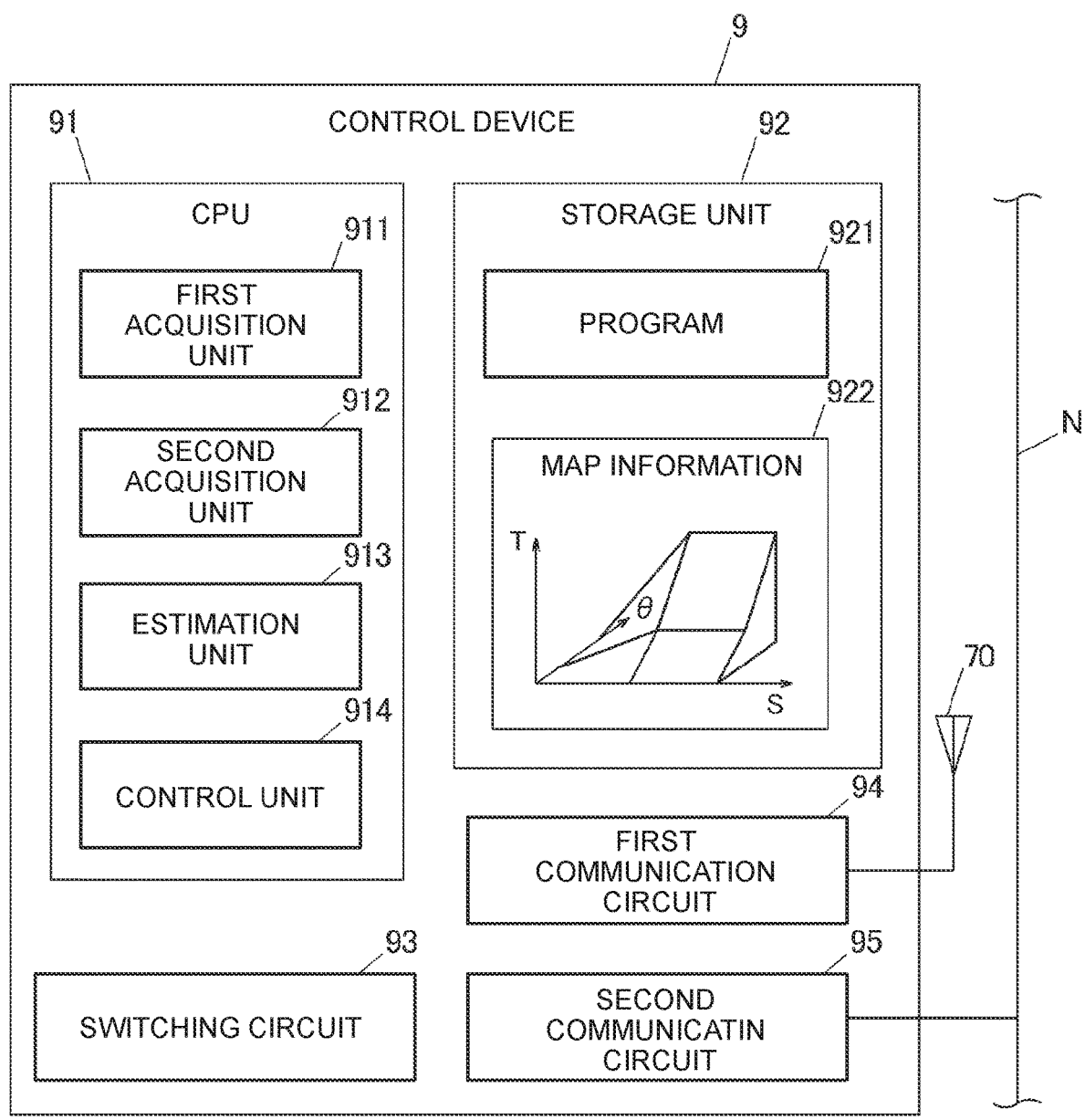

Portions (a) to (e) in FIG. 4 are explanatory diagrams showing, in time series, conditions where a host vehicle is passing another vehicle while the host vehicle is turning on a curved road when a wind is blowing from an outer side toward an inner side of turning;

FIG. 5A is a graph showing an example of forecast information generated by an estimation unit of the crosswind effect estimation device, and FIG. 5B is a graph showing an auxiliary drive force transmitted to right and left rear wheels when a drive force transmission device is controlled based on the generated forecast information;

Portions (a) to (e) in FIG. 6 are explanatory diagrams showing, in time series, conditions where the host vehicle is passing the other vehicle while the host vehicle is turning on a curved road when a wind is blowing from the inner side toward the outer side of turning;

FIG. 7A is a graph showing an example of forecast information generated by the estimation unit of the crosswind effect estimation device, and FIG. 7B is a graph showing the auxiliary drive force transmitted to the right and left rear wheels when the drive force transmission device is controlled based on the generated forecast information;

FIG. 8 is a schematic diagram showing a configuration example of a four-wheel-drive vehicle 1A according to a second embodiment;

FIG. 9 is a schematic diagram showing a configuration example of a four-wheel-drive vehicle 1B according to a third embodiment;

FIG. 10 is a schematic diagram showing a configuration example of a four-wheel-drive vehicle 1C according to a fourth embodiment; and FIG. 11 is a block diagram showing a configuration example of a control device according to a fifth embodiment.

DETAILED DESCRIPTION OF EMBODIMENTS

A first embodiment of the disclosure will be described with reference to FIGS. 1 to 7. Embodiments described below are specific examples. The technical scope of the disclosure is not limited to the specific examples.

Figure 1:
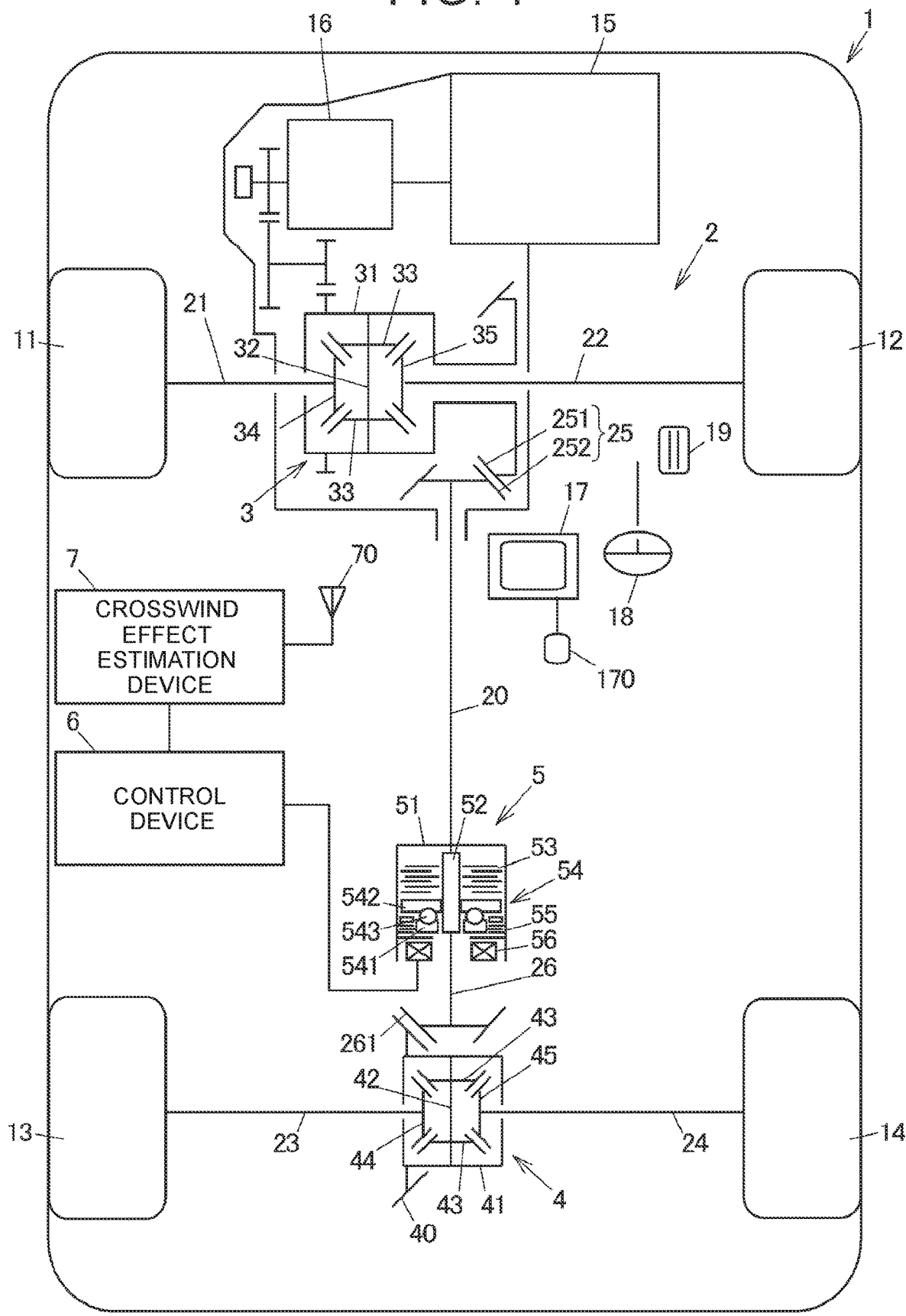
FIG. 1 is a schematic diagram showing a configuration example of a four-wheel-drive vehicle according to a first embodiment of the disclosure.

FIG. 1 is a schematic diagram showing a configuration example of a four-wheel-drive vehicle 1 according to the first embodiment of the disclosure. In the four-wheel-drive vehicle 1, front and rear wheels can be driven. In this embodiment, the four-wheel-drive vehicle 1 includes a right front wheel 12 and a left front wheel 11 as main drive wheels to which a drive force is constantly transmitted. The four-wheel-drive vehicle 1 also includes a right rear wheel 14 and a left rear wheel 13 as auxiliary drive wheels to which the drive force is transmitted in accordance with vehicle information. In the description below, the four-wheel-drive vehicle 1 may be sometimes referred to as a host vehicle 1.

The four-wheel-drive vehicle 1 includes an engine 15, a transmission 16, a vehicle navigation system 17, and a drive force transmission system 2. The engine 15 serves as a drive source. The transmission 16 changes a speed of rotation of an output shaft of the engine 15. The vehicle navigation system 17 provides the driver with route guidance to a destination based on a positional information obtained using a global positioning system (GPS) antenna 170. The drive force transmission system 2 transmits the drive force which is generated by the engine 15 to the right and left front wheels 12, 11 and the right and left rear wheels 14, 13 after the speed of rotation is changed by the transmission 16. As the drive source, for example, an electric motor may be used. Alternatively, the drive source may be a so-called hybrid system in which the engine and the electric motor are combined.

The drive force transmission system 2 includes right and left drive shafts 22, 21 on the front wheel side, right and left drive shafts 24, 23 on the rear wheel side, a front differential 3 that is a differential device on the front wheel side, a rear differential 4 that is a differential device on the rear wheel side, a propeller shaft 20 that transmits the drive force in a vehicle front-rear direction (i.e., from the front to the rear in the vehicle), and a drive force transmission device 5 that transmits the drive force to the right rear wheel 14 and the left rear wheel 13. Further, the four-wheel-drive vehicle 1 includes a control device 6 that controls the drive force transmission device 5 and a crosswind effect estimation device 7 that estimates an effect on the four-wheel-drive vehicle 1 due to a crosswind during traveling.

In this embodiment, the drive force transmission device 5 is disposed between the propeller shaft 20 and the rear differential 4. The drive force transmission device 5 is configured to adjust the drive force transmitted from the propeller shaft 20 to the right rear wheel 14 and the left rear wheel 13. With this configuration, a front-rear wheel drive force distribution ratio is variable. The front-rear wheel drive force distribution ratio is a ratio between the drive force distributed to the right and left front wheels 12, 11 and the drive force distributed to the right and left rear wheels 14, 13.

The front differential 3 includes a front differential case 31, a pinion shaft 32, a pair of pinion gears 33, and first and second side gears 34, 35. The pinion shaft 32 rotates integrally with the front differential case 31. The pinion gears 33 are supported by the pinion shaft 32. The first and second side gears 34, 35 mesh with the pinion gears 33 in a manner such that a gear axis of the pinion gears 33 is orthogonal to gear axes of the first and second side gears 34, 35. The front differential 3 distributes the drive force to the right front wheel 12 and the left front wheel 11. The first side gear 34 is coupled to the left drive shaft 21 on the front wheel side such that the first side gear 34 is not rotatable relative to the left drive shaft 21. The second side gear 35 is coupled to the right drive shaft 22 on the front wheel side such that the second side gear 35 is not rotatable relative to the right drive shaft 22.

The drive force output from the transmission 16 is transmitted to the front differential case 31 in the front differential 3, and further transmitted from the front differential case 31 to the propeller shaft 20 via a gear mechanism 25. The gear mechanism 25 is, for example, a hypoid gear pair. The gear mechanism 25 includes a ring gear 251 and a pinion gear 252 that mesh with each other. The ring gear 251 rotates integrally with the front differential case 31, and the pinion gear 252 is provided at one end of the propeller shaft 20. The other end of the propeller shaft 20 is coupled to the drive force transmission device 5 via a cross joint (not illustrated), for example.

The drive force transmission device 5 includes a bottomed cylindrical housing 51, an inner shaft 52, a multi-plate clutch 53, a cam mechanism 54, an electromagnetic clutch 55, and an electromagnetic coil 56. The drive force from the propeller shaft 20 is input to the housing 51. The inner shaft 52 is coaxially supported by the housing 51 so as to be rotatable relative to the housing 51. The multi-plate clutch 53 includes a plurality of clutch plates disposed between the housing 51 and the inner shaft 52. The cam mechanism 54 generates a pressing force for pressing the multi-plate clutch 53. The electromagnetic clutch 55 transmits an operation force for operating the cam mechanism 54. An excitation current is supplied from the control device 6 to the electromagnetic coil 56.

When the electromagnetic coil 56 is energized, the electromagnetic clutch 55 is engaged by the generated magnetic force, and a part of a rotational force of the housing 51 is transmitted to a pilot cam 541 of the cam mechanism 54 by the electromagnetic clutch 55. The cam mechanism 54 includes a pilot cam 541, a main cam 542, and a plurality of cam balls 543. The pilot cam 541 and the main cam 542 are relatively rotatable with each other within a predetermined angle range. The cam balls 543 are rollable between the pilot cam 541 and the main cam 542. Each of the pilot cam 541 and the main cam 542 includes a cam groove on which the cam balls 543 roll. The cam groove of the pilot cam 541 and the cam groove of the main cam 542 are inclined with respect to a circumferential direction of the pilot cam 541 and a circumferential direction of the main cam 542, respectively.

The main cam 542 is axially movable and not rotatable relative to the inner shaft 52. When the pilot cam 541 rotates relative to the main cam 542 due to a rotational force transmitted by the electromagnetic clutch 55, the cam balls 543 roll on the cam grooves, and the main cam 542 is moved away from the pilot cam 541. Accordingly, the multi-plate clutch 53 is pressed, and the clutch plates in the multi-plate clutch 53 are brought into a frictional contact with each other, and thus, the drive force is transmitted between the housing 51 and the inner shaft 52. The drive force transmitted by the multi-plate clutch 53 varies depending on the magnitude of a current supplied to the electromagnetic coil 56. The control device 6 increases or decreases an auxiliary drive force transmitted to the right and left rear wheels 14, 13 by changing the magnitude of the current supplied to the electromagnetic coil 56.

For example, when the four-wheel-drive vehicle 1 is traveling straight, and the multi-plate clutch 53 is pressed such that the clutch plates of the multi-plate clutch 53 do not rotate relative to each other, the front-rear wheel drive force distribution ratio is 50:50. When the multi-plate clutch 53 is not pressed and the drive force transmitted by the drive force transmission device 5 is zero (0), the front-rear wheel drive force distribution ratio is 100 (front wheels): 0 (rear wheels).

A pinion gear shaft 26 is coupled to the inner shaft 52 of the drive force transmission device 5. The pinion gear shaft 26 is not rotatable relative to the inner shaft 52. The pinion gear shaft 26 includes a gear portion 261 provided at its one end. The gear portion 261 of the pinion gear shaft 26 meshes with a ring gear 40 fixed to a rear differential case 41 of the rear differential 4.

The rear differential 4 includes the rear differential case 41, a pinion shaft 42, a pair of pinion gears 43, and first and second side gears 44, 45. The pinion shaft 42 rotates integrally with the rear differential case 41. The pinion gears 43 are supported by the pinion shaft 42. The first and second side gears 44, 45 mesh with the pinion gears 43 in a manner such that a gear axis of the pinion gears 43 is orthogonal to gear axes of the first and second side gears 44, 45. The rear differential 4 distributes the drive force to the right rear wheel 14 and the left rear wheel 13. The first side gear 44 is coupled to the left drive shaft 23 on the rear wheel side such that the first side gear 44 is not rotatable relative to the left drive shaft 23. The second side gear 45 is coupled to the right drive shaft 24 on the rear wheel side such that the second side gear 45 is not rotatable relative to the right drive shaft 24.

The control device 6 and the crosswind effect estimation device 7 can acquire various kinds of vehicle information through an in-vehicle communication network such as a controller area network (CAN). The vehicle information is information indicating conditions of parts of the four-wheel-drive vehicle 1, and includes information on a vehicle wheel speed of each of the right and left front wheels 12, 11 and the right and left rear wheels 14, 13, a steering angle of a steering wheel 18, a depressed amount of an accelerator pedal 19, and a vehicle speed, etc.

Further, an antenna 70 is connected to the crosswind effect estimation device 7. The crosswind effect estimation device 7 can perform inter-vehicle communication with other vehicles that travel near the host vehicle 1, and can also perform road-to-vehicle communication with a communication device installed on a road, using the antenna 70. An example of typical communication methods for the inter-vehicle communication and the road-to-vehicle communication is dedicated short range communications (DSRC) that is wireless communication and used for an intelligent transport systems (ITS).

Figure 2:
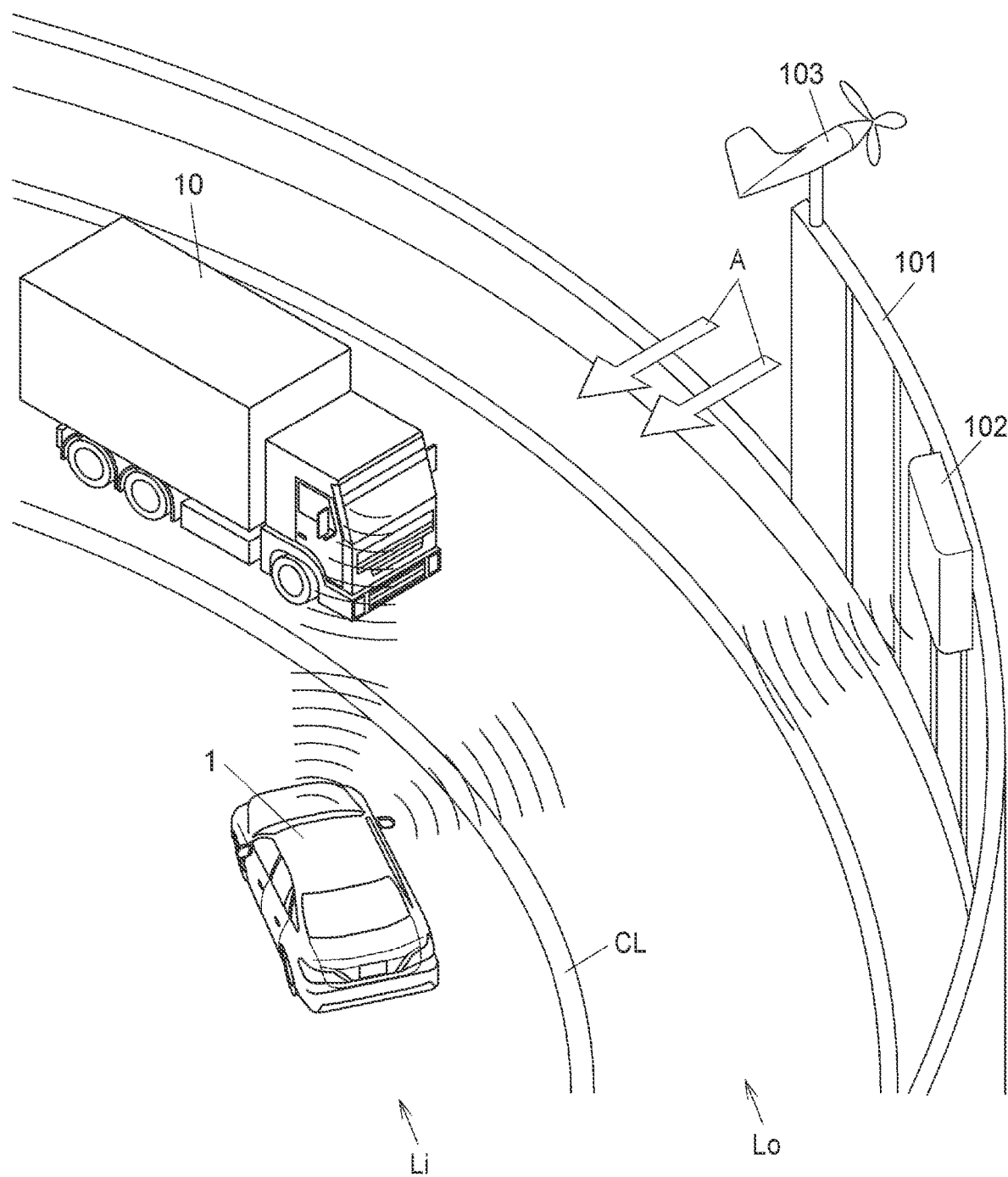
FIG. 2 is an explanatory diagram showing a specific example of inter-vehicle communication and road-to-vehicle communication.

FIG. 2 is an explanatory diagram showing a specific example of the inter-vehicle communication and the road-to-vehicle communication. FIG. 2 shows the host vehicle 1 that is turning on a curved road, and another vehicle (i.e., an oncoming vehicle) 10 that is traveling on an opposite lane, a noise barrier 101, a road-side communication device 102 that is a communication device installed on the road side, and an anemometer 103. The crosswind effect estimation device 7 of the host vehicle 1 can communicate with the other vehicle 10 and the road-side communication device 102 via the antenna 70. In the illustrated example in FIG. 2, the road-side communication device 102 is attached to an upper portion of the noise barrier 101. The road-side communication device 102 transmits the information on wind orientation and velocity measured by the anemometer 103 together with positional information regarding the road-side communication device 102. The other vehicle 10 is a truck having a longer overall length than that of the host vehicle 1.

Further, in FIG. 2, a plurality of arrows A show directions of the wind. In the illustrated example in FIG. 2, the direction of the wind extends from an outer side toward an inner side of the curved road. A lane Lo in which the other vehicle 10 travels is located on the windward side with respect to a lane Li in which the host vehicle 1 travels (i.e., the lane Lo is located windward of the lane Li). The lane Lo in which the other vehicle 10 travels and the lane Li in which the host vehicle 1 travels are separated by a center line CL. When the other vehicle 10 and the host vehicle 1 pass each other, the other vehicle 10 is located on the windward side with respect to the host vehicle 1 (i.e., the other vehicle 10 is located windward of the host vehicle 1), and serves as a shielding object that shields the host vehicle 1 against the crosswind.

The anemometer 103 is generally installed at a location where strong winds are likely to occur. The noise barrier 101 is installed between a road (the lanes Lo, Li) and the residential area, etc. For example, when a strong wind blows in directions indicated by the arrows A, the noise barrier 101 serves as a shielding object that is located on the windward side with respect to the host vehicle 1 (i.e., a shield object that is located windward of the host vehicle 1) and shields the host vehicle 1 against the crosswind. Therefore, the effect on the host vehicle 1 due to the crosswind significantly varies at or near a terminal end portion of the noise barrier 101. In the first embodiment, the crosswind effect estimation device 7 estimates the effect on the host vehicle 1 due to the crosswind in advance, that is, before the host vehicle 1 is actually affected by the crosswind.

Figure 3:
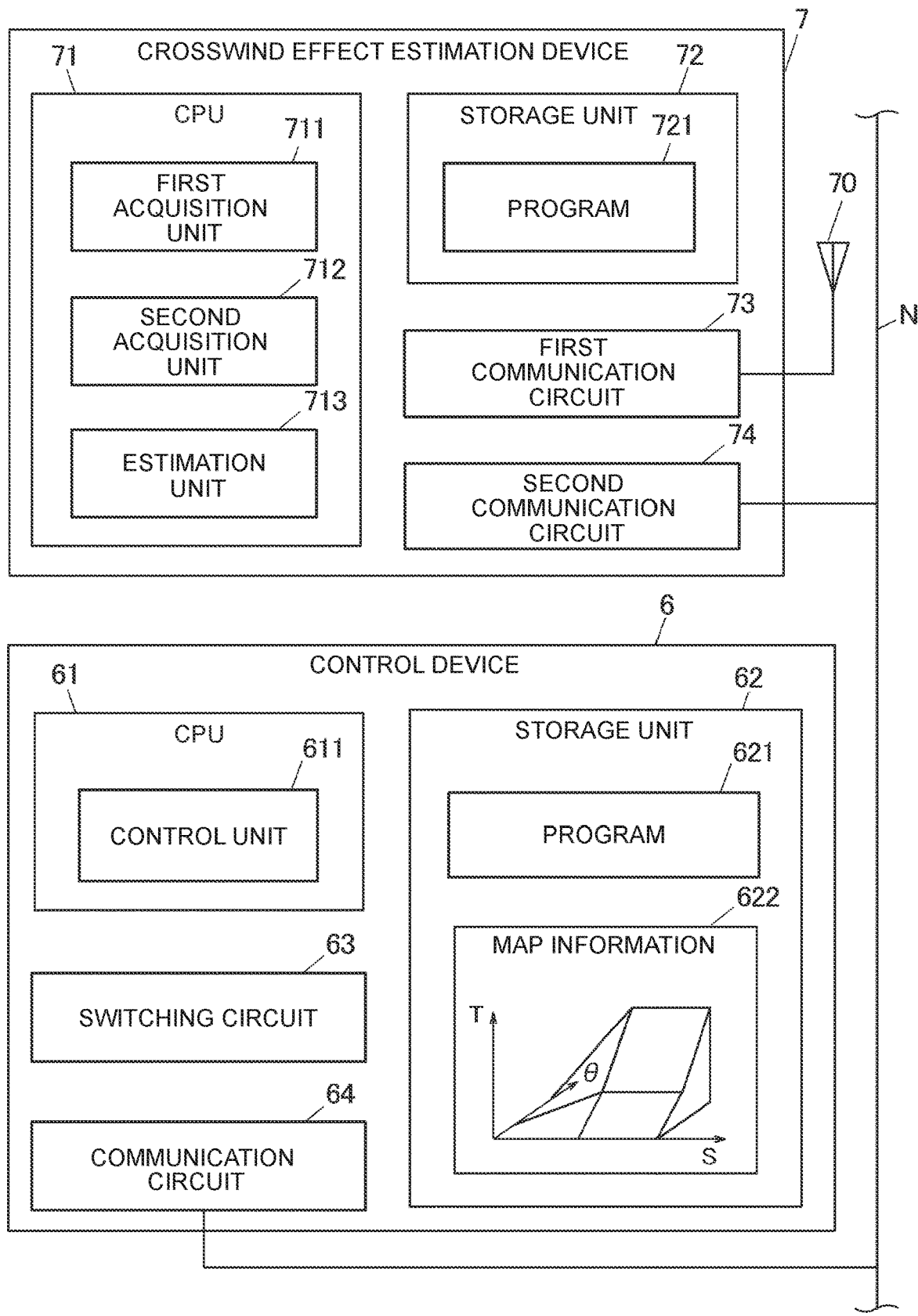
FIG. 3 is a block diagram showing a configuration example of a control device and a crosswind effect estimation device.

FIG. 3 is a block diagram showing a configuration example of the control device 6 and the crosswind effect estimation device 7. The control device 6 includes a central processing unit (CPU) 61, a storage unit 62, a switching circuit 63, and a communication circuit 64. The CPU 61 serves as a computation processing unit. The storage unit 62 includes semiconductor memory elements such as a read-only memory (ROM) and a random access memory (RAM). The switching circuit 63 generates current to be supplied to the electromagnetic coil 56 of the drive force transmission device 5. The communication circuit 64 performs communication via an in-vehicle communication network N. The storage unit 62 stores a program 621 and a map information 622. The program 621 indicates a procedure of computation processing to be executed by the CPU 61. The map information 622 indicates a relationship between the vehicle information regarding the four-wheel-drive vehicle 1 and a command torque indicating the drive force to be transmitted to the right and left rear wheels 14, 13.

The CPU 61 (i.e., the processor) functions as a control unit 611 that controls drive force distribution ratio between the right and left front wheels 12, 11 and the right and left rear wheels 14, 13, by executing the program 621. The control unit 611 calculates the command torque with reference to the map information 622 based on the vehicle information obtained by the communication circuit 64. Further, the control unit 611 sets a duty ratio (i.e., a duty cycle) of a PWM signal to be supplied to the switching circuit 63 in accordance with the command torque. Accordingly, the switching circuit 63 supplies the current in accordance with the command torque to the electromagnetic coil 56 of the drive force transmission device 5, and thus, the drive force is transmitted to the right and left rear wheels 14, 13.

A relationship of a vehicle speed S and a steering angle θ of the steering wheel 18 with a command torque T is defined in the map information 622 to which the control unit 611 refers when the host vehicle 1 is turning on a curved road. The command torque T tends to increase as the vehicle speed S increases and as the steering angle θ increases.

The crosswind effect estimation device 7 includes a CPU 71, a storage unit 72, a first communication circuit 73, and a second communication circuit 74. The CPU 71 serves as a computation processing unit. The storage unit 72 includes semiconductor memory elements such as a ROM and a RAM. The first communication circuit 73 performs communication using the antenna 70. The second communication circuit 74 performs communication via the in-vehicle communication network N. The CPU 71 (i.e., the processor) functions as a first acquisition unit 711, a second acquisition unit 712, and an estimation unit 713 by executing a program 721 stored in the storage unit 72.

The first acquisition unit 711 acquires information on the crosswind within a predetermined region forward of (i.e., ahead of) the host vehicle 1 in the traveling direction of the host vehicle 1, via the road-to-vehicle communication, for example. The second acquisition unit 712 acquires information on the shielding object that is located on the windward side in a direction of the crosswind with respect to the host vehicle 1 (i.e., the shielding object that is located windward of the host vehicle 1 in the direction of the crosswind) via the inter-vehicle communication, for example. When the first acquisition unit 711 acquires the information on the crosswind via the road-to-vehicle communication, the predetermined region mentioned above is a region where the first acquisition unit 711 can communicate with the road-side communication device 102. In this case, for example, the predetermined region is a region with a radius of 100 m. The second acquisition unit 712 acquires the information on the shielding object that is located on the windward side in a direction of the crosswind in the predetermined region.

The estimation unit 713 estimates the effect on the host vehicle 1 due to the crosswind based on the information on the crosswind acquired by the first acquisition unit 711 and the information on the shielding object obtained by the second acquisition unit 712. Further, the estimation unit 713 generates forecast information including a time when or a position where the effect due to the crosswind changes based on the estimation result, and transmits the generated forecast information to the control device 6 via the in-vehicle communication network N. The forecast information is a predicted value obtained by predicting, on the assumption that the vehicle 1 travels at the vehicle speed and the steering angle at a time point when the estimation unit 713 generates the forecast information, a strength of the crosswind based on the time elapsed after the time point or each position along a traveling route of the host vehicle 1 in consideration of the presence of the shielding object.

In the example shown in FIG. 2, the first communication circuit 73 receives the information on the wind orientation and velocity measured by the anemometer 103, together with the positional information regarding the road-side communication device 102, via communication with the road-side communication device 102, and then the first acquisition unit 711 acquires this information. The first acquisition unit 711 calculates a wind velocity having a component that is perpendicular to the traveling direction of the host vehicle 1 based on the acquired information. The positional information regarding the vehicle 1 can be acquired from, for example, the vehicle navigation system 17 via the in-vehicle network N.

When the four-wheel-drive vehicle 1 is provided with a camera that captures an image of a scene ahead of the vehicle 1 in the traveling direction of the vehicle 1, the first acquisition unit 711 may acquire the information on the crosswind based on an image of a wind streamer (i.e., a wind sock) installed at the side of the road. Further, the second acquisition unit 712 may acquire the information on the shielding object based on an image captured by the camera above. In this case, it is possible to detect other vehicles that are not equipped with a communication function capable of performing the inter-vehicle communication and fixed objects, such as the noise barrier 101 and buildings, as the shielding objects, and the estimation unit 713 can generate the forecast information in consideration of effects on the crosswind due to the detected shielding objects above.

When the second acquisition unit 712 detects another vehicle that is capable of performing the inter-vehicle communication with the host vehicle 1 as the shielding object, the second acquisition unit 712 acquires information on the vehicle speed and traveling direction of the other vehicle via the inter-vehicle communication. The estimation unit 713 generates the forecast information including the time when or the position where the effect due to the crosswind changes, based on the vehicle speed and the traveling direction of the other vehicle. Note that, even when another vehicle is present near the host vehicle 1, the second acquisition unit 712 does not detect the other vehicle as the shielding object if the other vehicle is located on the leeward side with respect to the host vehicle 1 (i.e., if the other vehicle is located leeward of the host vehicle 1) or the other vehicle is moving away from the host vehicle 1.

When the second acquisition unit 712 detects another vehicle that is capable of performing the inter-vehicle communication as the shielding object, the second acquisition unit 712 acquires the information on the size of the other vehicle, including the overall length and overall height of the other vehicle. The estimation unit 713 generates the forecast information, including the time when or the position where the effect on the host vehicle 1 due to the crosswind increases and decreases, based on the overall length of the other vehicle. Further, the estimation unit 713 estimates the magnitude of the effect on the host vehicle 1 due to the crosswind based on the size of the other vehicle that is the shielding object, and generates the forecast information including this estimated value. In this embodiment, the yaw moment to be generated in the host vehicle 1 is estimated as the effect due to the crosswind. The magnitude of the effect due to the crosswind corresponds to the magnitude of the yaw moment.

Portions (a) to (e) in FIG. 4 are explanatory diagrams showing the conditions, in a time series, when the host vehicle 1 passes the other vehicle 10 while turning on a curved road. The arrows A shown in the portions (a) to (e) in FIG. 4 indicate the direction of the wind. FIG. 5A is a graph showing an example of the forecast information generated by the estimation unit 713. FIG. 5B is a graph showing the auxiliary drive force transmitted to the right and left rear wheels 14, 13 when the drive force transmission device 5 is controlled based on the generated forecast information.

The portions (a) to (e) in FIG. 4 indicate the case where the wind is blowing from the outer side toward the inner side of turning, and arched arrows at the center of the host vehicle 1 indicate the directions and magnitude of the yaw moment generated by the crosswind. The length of each arched arrow indicates the magnitude of the generated yaw moment. In FIGS. 5A and 5B, the horizontal axis is a time axis, and the time points corresponding to the conditions shown in the portions (a) to (e) in FIG. 4 are indicated as Ta to Te. That is, the time point when the condition shown in the portion (a) in FIG. 4 occurs corresponds to Ta in the graphs shown in FIGS. 5A and 5B. Similarly, the conditions shown in the portions (b) to (e) in FIG. 4 correspond to Tb to Te shown in the graphs in FIGS. 5A and 5B, respectively.

The portion above the time axis in FIG. 5A indicates a tendency of oversteer, and the portion below the time axis indicates a tendency of understeer. A broken line in FIG. 5B indicates the auxiliary drive force in the case of no wind.

Generally, when the vehicle is turning, as the drive force and tire lateral force (cornering force) transmitted to the vehicle wheels increase, and as a ground contact load of a tire decreases, lateral slip is more likely to occur. Therefore, in the four-wheel-drive vehicle 1, as the auxiliary drive force transmitted to the right and left rear wheels 14, 13 increases, the tendency of oversteer increases, and the auxiliary drive force transmitted to the right and left rear wheels 14, 13 decreases, the tendency of understeer increases. By utilizing the characteristic above, when the yaw moment with the tendency of oversteer is generated by the crosswind, the auxiliary drive force is reduced. When the yaw moment with the tendency of understeer is generated by the crosswind, the auxiliary drive force is increased. Thus, the driver can drive the four-wheel-drive vehicle 1 while having a feeling similar to that in the case of no wind.

The portion (a) in FIG. 4 indicates the condition before the host vehicle 1 and the other vehicle 10 overlap each other in a direction of the crosswind. In this condition, the host vehicle 1 sways toward the inner side of turning due to the crosswind. Therefore, the yaw moment with the tendency of oversteer is generated by the crosswind. In this condition, the effect due to the crosswind can be reduced by reducing the auxiliary drive force as compared to that in the case of no wind.

The portion (b) in FIG. 4 indicates the condition when a part of a front side of the host vehicle 1 overlaps the other vehicle 10 in the direction of the crosswind. In this condition, a part of a rear side of the host vehicle 1 is affected by the crosswind. Therefore, the host vehicle 1 is oriented toward the outer side of turning, which causes strong understeer. In this condition, the effect due to the crosswind can be reduced by increasing the auxiliary drive force.

The portion (c) in FIG. 4 indicates the condition when the host vehicle 1 overlaps the other vehicle 10 over the entire length of the host vehicle 1, and the host vehicle is located leeward of the other vehicle 10. In this condition, the host vehicle 1 temporarily receives no wind. Therefore, the yaw moment due to the crosswind is not generated, and the auxiliary drive force equivalent to that in the case of no wind is transmitted to the right and left rear wheels 14, 13. The length of time during which the host vehicle 1 receives no wind varies depending on the overall length of the other vehicle 10.

The portion (d) in FIG. 4 indicates the condition where a part of the rear side of the host vehicle 1 overlaps the other vehicle 10 in the direction of the crosswind. In this condition, a part of the front side of the host vehicle 1 is affected by the crosswind. Therefore, the host vehicle 1 is oriented toward the inner side of turning, which causes strong oversteer. In this condition, the effect due to the crosswind can be reduced by reducing the auxiliary drive force.

The portion (e) in FIG. 4 indicates the condition where the host vehicle 1 has passed the position on the leeward side with respect to the other vehicle 10 (i.e., the position that is leeward of the other vehicle 10). In this condition, the yaw moment with the tendency of oversteer, which is equivalent to the yaw moment in the condition before the host vehicle 1 overlaps the other vehicle 10 in the direction of the crosswind as shown in the portion (a) in FIG. 4, is generated The crosswind effect estimation device 7 transmits the forecast information regarding the yaw moment shown in FIG. 5A to the control device 6 before the yaw moment generated by the crosswind in the host vehicle 1 actually changes. More specifically, for example, when the host vehicle 1 is traveling several meters before the position where a front end portion of the host vehicle 1 overlaps a front end portion of the other vehicle 10 in a lateral direction, the crosswind effect estimation device 7 transmits the forecast information regarding the yaw moment from Ta to Te shown in FIG. 5A to the control device 6. With this configuration, as compared to the case where, for example, the current supplied to the electromagnetic coil 56 of the drive force transmission device 5 is increased or decreased after a change in the yaw moment generated by the crosswind is detected, a behavior of the host vehicle 1 can be stabilized without causing the driver to have a feeling of anxiety.

For example, the control unit 611 corrects the command torque by multiplying the command torque T obtained by referring to the map information 622 by a correction coefficient corresponding to the magnitude of the yaw moment indicated by the forecast information, and sets a duty ratio for a PWM signal to be supplied to the switching circuit 63 based on the corrected command torque.

The portions (a) to (e) in FIG. 6 are explanatory diagrams indicating, in time series, the conditions where the host vehicle 1 is located leeward of the other vehicle 10, and passes the other vehicle 10 when the wind is blowing from the inner side toward the outer side of turning, that is, in a direction opposite to a direction in which the wind is blowing in the portions (a) to (e) in FIG. 4. FIG. 7A is a graph showing an example of the forecast information generated by the estimation unit 713 under the condition described above. FIG. 7B is a graph showing the auxiliary drive force transmitted to the right and left rear wheels 14, 13 when the drive force transmission device 5 is controlled based on the forecast information shown in FIG. 7A.

When the crosswind blows from the inner side toward the outer side of turning, as shown in FIGS. 7A and 7B, the relationship between oversteer and understeer of the generated yaw moment, and the increase and decrease of the auxiliary drive force are opposite to those shown in FIGS. 5A and 5B.

According to the first embodiment of the disclosure as described above, it is possible to accurately estimate the effect on the host vehicle 1 due to the crosswind, in consideration of the presence of a shielding object against the crosswind. Further, the drive force transmission device 5 is controlled based on the effect due to the crosswind, which is estimated in consideration of the presence of a shielding object. Therefore, a vehicle behavior can be stabilized by changing the auxiliary drive force in synchronization with changes in effect due to the crosswind such that the effect due to the crosswind is reduced.

Next, a second embodiment of the disclosure will be described. In the first embodiment, the disclosure is applied to the four-wheel-drive vehicle 1 in which the front-rear wheel drive force distribution ratio can be controlled by the control device 6. In the second embodiment and subsequent third and fourth embodiments, the disclosure is applied to a four-wheel-drive vehicle in which a drive force distribution ratio between the right and left wheels, more specifically, a drive force distribution ratio between the right rear wheel 14 and the left rear wheel 13 can be controlled.

FIG. 8 is a schematic diagram showing a configuration example of a four-wheel-drive vehicle 1A according to the second embodiment. In FIG. 8, the same components as those described with reference to FIG. 1 will be denoted by the same reference signs, and detailed description thereof will be omitted.

In the four-wheel-drive vehicle 1A, a ring gear 461 of a rear-side rotary member 46 meshes with a pinion gear 201 provided at a rear end of the propeller shaft 20. The rear-side rotary member 46 includes a shaft portion 462 at the center thereof. A right-side drive force transmission device 5R and a left-side drive force transmission device 5L are disposed next to the shaft portion 462 in a vehicle width direction. The right- and left-side drive force transmission devices 5R, 5L each include the housing 51, the inner shaft 52, the multi-plate clutch 53, the cam mechanism 54, the electromagnetic clutch 55, and the electromagnetic coil 56, similarly to the configuration of the drive force transmission device 5 according to the first embodiment The housing 51 of the left-side drive force transmission device 5L is connected to the shaft portion 462 by a connection shaft 471 and rotates integrally with the rear-side rotary member 46. The housing 51 of the right-side drive force transmission device 5R is connected to the shaft portion 462 by a connection shaft 472 and rotates integrally with the rear-side rotary member 46. The drive shaft 23 is connected to the inner shaft 52 of the left-side drive force transmission device 5L so as not to be rotatable relative to the inner shaft 52. The drive shaft 24 is connected to the inner shaft 52 of the right-side drive force transmission device 5R so as not to be rotatable relative to the inner shaft 52.

An excitation current is supplied from a control device 6A to the electromagnetic coil 56 in each of the right- and left-side drive force transmission devices 5R, 5L. In the second embodiment, the control device 6A can independently increase or decrease the excitation current that is supplied to the electromagnetic coil 56 of each of the right-side drive force transmission device 5R and the left-side drive force transmission device 5L. Thus, the drive force is transmitted to the left rear wheel 13 in accordance with the current supplied to the electromagnetic coil 56 of the left-side drive force transmission device 5L. The drive force is transmitted to the right rear wheel 14 in accordance with the current supplied to the electromagnetic coil 56 of the right-side drive force transmission device 5R.

The control device 6A increases or decreases the current to be supplied to the electromagnetic coil 56 of each of the right-side drive force transmission device 5R and the left-side drive force transmission device 5L in accordance with the yaw moment that is estimated to be generated, based on the forecast information acquired from the crosswind effect estimation device 7. That is, when it is estimated that a counterclockwise yaw moment with respect to the center of gravity of the four-wheel-drive vehicle 1A is generated by the crosswind, the control device 6A increases the current to be supplied to the electromagnetic coil 56 of the left-side drive force transmission device 5L at that timing or decreases the current to be supplied to the electromagnetic coil 56 of the right-side drive force transmission device 5R at that timing such that a clockwise yaw moment is generated. Further, when it is estimated that a clockwise yaw moment with respect to the center of gravity of the four-wheel-drive vehicle 1A is generated by the crosswind, the control device 6A increases the current to be supplied to the electromagnetic coil 56 of the right-side drive force transmission device 5R at that timing or decreases the current to be supplied to the electromagnetic coil 56 of the left-side drive force transmission device 5L at that timing such that a counterclockwise yaw moment is generated.

With this configuration, a vehicle behavior can be stabilized by controlling the drive force distribution ratio between the right rear wheel 14 and the left rear wheel 13 such that the effect due to the crosswind is reduced.

Next, a third embodiment of the disclosure will be described with reference to FIG. 9. FIG. 9 is a schematic diagram showing a configuration example of a four-wheel-drive vehicle 1B according to the third embodiment. In FIG. 9, the same components as those described with reference to FIGS. 1 and 8 will be denoted by the same reference signs, and detailed description thereof will be omitted.

In the first and second embodiments, a part of the drive force from the engine 15 is distributed to the right and left rear wheels 14, 13. In the third embodiment, in addition to the engine 15, an electric motor 81 is provided as a drive source for driving the right and left rear wheels 14, 13. A drive force generated by the electric motor 81 is transmitted to the rear-side rotary member 46 via a speed reduction mechanism 82. The speed reduction mechanism 82 includes a pinion gear 821, a large diameter gear portion 822, and a small diameter gear portion 823. The pinion gear 821 is fixed to a shaft of the electric motor 81. The large diameter gear portion 822 meshes with the pinion gear 821. The small diameter gear portion 823 meshes with the ring gear 461. The large diameter gear portion 822 and the small diameter gear portion 823 are connected with each other so as not to be rotatable relative to each other.

In the third embodiment, a control device 6B controls a rotation speed of and output torque from the electric motor 81 by supplying a motor current to the electric motor 81. Further, similarly to the second embodiment, the control device 6B supplies an excitation current to the electromagnetic coil 56 of each of the right-side drive force transmission device 5R and the left-side drive force transmission device 5L so as to counter the yaw moment that is estimated to be generated by the crosswind, based on the forecast information acquired from the crosswind effect estimation device 7. With this configuration, also in the third embodiment, a vehicle behavior can be stabilized even when the four-wheel-drive vehicle 1B is traveling while being affected by the crosswind.

Next, a fourth embodiment of the disclosure will be described with reference to FIG. 10. FIG. 10 is a schematic diagram showing a configuration example of a four-wheel-drive vehicle 1C according to the fourth embodiment. In FIG. 10, the same components as those described with reference to FIG. 1 will be denoted by the same reference signs, and detailed description thereof will be omitted.

In the fourth embodiment, the four-wheel-drive vehicle 1C includes a left-side electric motor 83 configured to drive the left rear wheel 13 and a right-side electric motor 84 configured to drive the right rear wheel 14. A drive force generated by the left-side electric motor 83 is transmitted to the drive shaft 23 via a left-side speed reduction mechanism 85. A drive force generated by the right-side electric motor 84 is transmitted to the drive shaft 24 via a right-side speed reduction mechanism 86.

The left-side speed reduction mechanism 85 includes a pinion gear 851, a large diameter gear portion 852, and a small diameter gear portion 853. The pinion gear 851 is fixed to a shaft of the left-side electric motor 83. The large diameter gear portion 852 meshes with the pinion gear 851. The small diameter gear portion 853 meshes with a gear portion 231 of the drive shaft 23. The large diameter gear portion 852 and the small diameter gear portion 853 are connected with each other so as not to be rotatable relative to each other. The right-side speed reduction mechanism 86 includes a pinion gear 861, a large diameter gear portion 862, and a small diameter gear portion 863. The pinion gear 861 is fixed to a shaft of the right-side electric motor 84. The large diameter gear portion 862 meshes with the pinion gear 861. The small diameter gear portion 863 meshes with a gear portion 241 of the drive shaft 24. The large diameter gear portion 862 and the small diameter gear portion 863 are connected with each other so as not to be rotatable relative to each other.

In the fourth embodiment, a control device 6C controls rotational speeds of and output torque from the right-side electric motor 84 and left-side electric motor 83 by supplying the motor current to the right- and left-side electric motors 84, 83. Further, the control device 6C supplies the motor current to the right- and left-side electric motors 84, 83 so as to counter the yaw moment that is estimated to be generated by the crosswind, based on the forecast information acquired from the crosswind effect estimation device 7. With this configuration, also in the fourth embodiment, a vehicle behavior can be stabilized even when the four-wheel-drive vehicle 1C is traveling while being affected by the crosswind.

Next, a fifth embodiment of the disclosure will be described with reference to FIG. 11. In the first to fourth embodiments, the control devices 6, 6A, 6B, 6C are provided separately from the crosswind effect estimation device 7, and the forecast information generated by the crosswind effect estimation device 7 is transmitted to the control devices 6, 6A, 6B, and 6C. However, in the fifth embodiment, a control device 9 has functions of the crosswind effect estimation device 7.

The control device 9 shown in FIG. 11 can be replaced with the control device 6 and the crosswind effect estimation device 7 of the four-wheel-drive vehicle 1 according to the first embodiment. The control device 9 includes a CPU 91, a storage unit 92, a switching circuit 93, a first communication circuit 94, and a second communication circuit 95. The switching circuit 93 generates a current supplied to the electromagnetic coil 56 of the drive force transmission device 5. The first communication circuit 94 performs communication using the antenna 70. The second communication circuit 95 performs communication via the in-vehicle communication network N. The storage unit 92 stores a program 921 and map information 922. The CPU 91 (i.e., the processor) functions as a first acquisition unit 911, a second acquisition unit 912, an estimation unit 913, and a control unit 914, by executing the program 921. The functions of the first acquisition unit 911, the second acquisition unit 912, and the estimation unit 913 are the same as those of the first acquisition unit 711, the second acquisition unit 712, and the estimation unit 713 of the crosswind effect estimation device 7 according to the first embodiment. The function of the control unit 914 is the same as that of the control unit 611 of the control device 6 according to the first embodiment.

With the control device 9 described above, the same operations and advantageous effects as in the first embodiment can be achieved.

While the embodiments of the disclosure have been described above, the disclosure is not limited to the embodiments above.

The embodiments of the disclosure may be modified appropriately in various ways by omitting a part of the configurations, or adding or replacing configurations within the scope of the disclosure. For example, in the first to fourth embodiments, the control devices 6, 6A, 6B, and 6C, which control the drive force distribution ratio, acquire the forecast information generated by the crosswind effect estimation device 7. However, the forecast information generated by the crosswind effect estimation device 7 may be transmitted to, for example, a steer-by-wire steering system, and control may be executed to reduce an effect due to the crosswind by changing a steered angle of steered wheels.

In the embodiments described above, the disclosure is applied to the four-wheel-drive vehicles 1, 1A, 1B, and 1C. However, the disclosure is not limited to the four-wheel-drive vehicle, and the disclosure may be applied to a two-wheel-drive vehicle in which right and left front wheels are driven. In this case, even when the two-wheel-drive vehicle is traveling while being affected by the crosswind, a vehicle behavior can be stabilized by controlling the drive force transmitted to the right and left front wheels such that the effect due to the crosswind is reduced.

In the embodiments described above, the right and left front wheels 12, 11 are main drive wheels and the right and left rear wheels 14, 13 are auxiliary drive wheels. However, the disclosure is not limited to this configuration, and the right and left front wheels 12, 11 may be auxiliary drive wheels, and the right and left rear wheels 14, 13 may be main drive wheels.

What is claimed is:

1. A crosswind effect estimation device that is mounted in a vehicle and configured to estimate an effect on the vehicle due to a crosswind, the crosswind effect estimation device comprising:
a processor configured to:

i) acquire information on the crosswind in a predetermined region forward of the vehicle in a traveling direction of the vehicle, ii) acquire information on at least one shielding object that is located on a windward side in a direction of the crosswind, iii) estimate the effect on the vehicle due to the crosswind based on the acquired information on the crosswind and the acquired information on the shielding object, iv) acquire information on a vehicle speed and a traveling direction of an other vehicle when the other vehicle is one of the at least one shielding object, v) acquire information regarding one of the at least one shielding object transmitted from a road-side communication device fixed on a road-side shielding object, vi) estimate a yaw moment to be generated in the vehicle as the effect due to the crosswind, vii) estimate the yaw moment to be generated before the vehicle and the one of the at least one shielding object overlap each other, viii) estimate the yaw moment to be generated when a part of the vehicle overlaps the one of the at least one shielding object, and ix) estimate the yaw moment to be generated when the vehicle overlaps the one of the at least one shielding object over an entire length of the vehicle.

2. The crosswind effect estimation device according to claim 1, wherein the processor is configured to generate forecast information including a time when or a position where the effect due to the crosswind changes, based on the vehicle speed and the traveling direction of the other vehicle.

3. The crosswind effect estimation device according to claim 2, wherein the processor is configured to further acquire information on a length of the other vehicle, and to generate the forecast information including a time when or a position where the effect due to the crosswind is increased and a time when or a position where the effect due to the crosswind is decreased, based on an overall length of the other vehicle.

4. The crosswind effect estimation device according to claim 1, wherein the processor is configured to acquire information on a size of the at least one shielding object, and to estimate magnitude of the effect due to the crosswind, based on the size of the at least one shielding object.

5. A control device for a vehicle including vehicle wheels including right and left front wheels and right and left rear wheels, the control device being configured to control a drive force distribution ratio for the vehicle wheels, the control device comprising:

at least one processor configured to:

i) acquire information on a crosswind in a predetermined region forward of the vehicle in a traveling direction of the vehicle, ii) acquire information on at least one shielding object that is located on a windward side in a direction of the crosswind, iii) estimate an effect on the vehicle due to the crosswind to obtain an estimation result, based on the acquired information on the crosswind and the acquired information on the shielding object, iv) control the drive force distribution ratio for the vehicle wheels, based on the obtained estimation result, v) acquire information on a vehicle speed and a traveling direction of an other vehicle when the other vehicle is one of the at least one shielding object, vi) acquire information regarding one of the at least one shielding object transmitted from a road-side communication device fixed on a road-side shielding object, vii) estimate a yaw moment to be generated in the vehicle as the effect due to the crosswind, viii) estimate the yaw moment to be generated before the vehicle and the one of the at least one shielding object overlap each other, ix) estimate the yaw moment to be generated when a part of the vehicle overlaps the one of the at least one shielding object, and x) estimate the yaw moment to be generated when the vehicle overlaps the one of the at least one shielding object over an entire length of the vehicle.

6. The control device according to claim 5, wherein:

the vehicle is a four-wheel-drive vehicle in which one of i) the right and left front wheels and ii) the right and left rear wheels are main drive wheels and the other of i) the right and left front wheels and ii) the right and left rear wheels are auxiliary drive wheels; and the at least one processor is configured to control a drive force transmission device configured to transmit a drive force to the auxiliary drive wheels.

7. The control device according to claim 5, wherein:

the drive force distribution ratio between right and left wheels among the vehicle wheels is variable; and the at least one processor is configured to control the drive force distribution ratio between the right and left wheels such that the effect due to the crosswind is reduced.

* * * * *